(12) United States Patent  
Yonezawa et al.

(10) Patent No.: US 11,458,948 B2
(45) Date of Patent: Oct. 4, 2022

(54) HYBRID VEHICLE AND METHOD OF CONTROLLING HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 269 days.

(21) Appl. No.: 16/819,950

(22) Filed: Mar. 16, 2020

(65) Prior Publication Data

US 2020/0307546 A1 Oct. 1, 2020

(30) Foreign Application Priority Data

Mar. 26, 2019 (JP) .............................. JP2019-058329

(51) Int. Cl.
*B60W 20/10* (2016.01)
*B60W 10/08* (2006.01)
(Continued)

(52) U.S. Cl.
CPC ............ *B60W 20/10* (2013.01); *B60W 10/06* (2013.01); *B60W 10/08* (2013.01); *B60W 30/1882* (2013.01); *B60W 2510/0666* (2013.01)

(58) Field of Classification Search
CPC ...... B60W 20/10; B60W 10/06; B60W 10/08; B60W 30/1882; B60W 30/0666;
(Continued)

(56) References Cited

U.S. PATENT DOCUMENTS

2012/0035017 A1* 2/2012 Nagai ..................... F02D 23/00
477/32
2015/0038292 A1* 2/2015 Tokura ................... F02D 23/00
477/33

(Continued)

FOREIGN PATENT DOCUMENTS

CN 102395497 A 3/2012
CN 104145107 A 11/2014
(Continued)

*Primary Examiner* — Tyler J Lee
*Assistant Examiner* — Yufeng Zhang
(74) *Attorney, Agent, or Firm* — Sughrue Mion, PLLC

(57) ABSTRACT

An HV-ECU performs processing including calculating requested system power, calculating requested engine power when an engine activation request has been issued, setting an operating point on a predetermined operating line, setting an upper limit value of magnitude of an amount of lowering in engine rotation speed to a first value when a vehicle is in a sport running state and when the previous operating point is within a forced induction range, setting the upper limit value to a second value when the vehicle is not in the sport running state or when the previous operating point is not within the forced induction range, correcting the operating point, and outputting an engine operation state command, a first MG torque command, and a second MG torque command.

4 Claims, 5 Drawing Sheets

(51) Int. Cl.
*B60W 10/06* (2006.01)
*B60W 30/188* (2012.01)

(58) Field of Classification Search
CPC . B60W 2710/0661; B60W 2710/0677; B60W 20/15; B60Y 2400/435; Y02T 10/62
See application file for complete search history.

(56) References Cited

U.S. PATENT DOCUMENTS

| | | | | |
|---|---|---|---|---|
| 2015/0225927 A1* | 8/2015 | Hoshino | ................. | F02D 29/04 |
| | | | | 701/50 |
| 2016/0108832 A1* | 4/2016 | Kumagai | ................. | F02D 41/10 |
| | | | | 903/905 |
| 2017/0036662 A1* | 2/2017 | Chen | ................... | B60W 30/182 |

FOREIGN PATENT DOCUMENTS

| | | | |
|---|---|---|---|
| CN | 104395539 | A | 3/2015 |
| CN | 104417544 | A | 3/2015 |
| CN | 105228876 | A | 1/2016 |
| JP | 2015-058924 | A | 3/2015 |

\* cited by examiner

HYBRID VEHICLE AND METHOD OF CONTROLLING HYBRID VEHICLE This nonprovisional application is based on Japanese Patent Application No. 2019-058329 filed with the Japan Patent Office on Mar. 26, 2019, the entire contents of which are hereby incorporated by reference.

BACKGROUND

Field

The present disclosure relates to control of a hybrid vehicle incorporating a motor and an engine including a forced induction device as drive sources.

Description of the Background Art

A hybrid vehicle that incorporates a motor and an engine as drive sources, includes a power storage charged with motive power of the engine, and runs with motive power of the engine has conventionally been known. Some engines mounted on such a hybrid vehicle include a forced induction device such as a turbo charger.

For example, Japanese Patent Laying-Open No. 2015-58924 discloses a hybrid vehicle incorporating a motor and an engine including a turbo charger.

SUMMARY

In the hybrid vehicle described above, when an operation to turn off an accelerator is performed during running of the vehicle using motive power of the engine, power requested of the engine is lowered or the engine is stopped in response to an operation by a user from a point of view of improvement in fuel efficiency. When an operation to turn on the accelerator is again performed in a short period of time after the operation to turn off the accelerator, however, a lag in acceleration due to response delay of a boost pressure may occur. In particular, in the hybrid vehicle, the engine may be stopped also by the operation to turn off the accelerator as described above. Therefore, when the operation to turn on the accelerator is performed in a short period of time after the operation to turn off the accelerator, a lag of acceleration may more noticeably occur. Consequently, drivability of the vehicle may become poor.

An object of the present disclosure is to provide a hybrid vehicle that achieves suppressed occurrence of a lag of acceleration due to response delay of a boost pressure and a method of controlling a hybrid vehicle.

A hybrid vehicle according to one aspect of the present disclosure includes an engine including a forced induction device, a motor generator that generates electric power by using motive power of the engine, a power divider that divides motive power output from the engine into motive power to be transmitted to the motor generator and motive power to be transmitted to a drive wheel, and a controller that sets an operating point at which requested engine power requested of the engine is output and controls the engine and the motor generator to achieve the set operating point. When the requested engine power is lowered in a forced induction range where a forced induction operation is performed by the forced induction device, the controller sets an upper limit value of magnitude of change per prescribed time period of the operating point to be smaller than when the requested engine power is lowered in a non-forced induction range.

By doing so, for example, even when an operation to turn on the accelerator is performed in a short period of time after the operation to turn off the accelerator in the forced induction range, change of the operating point is slower than in the non-forced induction range. Therefore, a boost pressure can be maintained and quick stop of the engine can be suppressed. Therefore, occurrence of a lag in acceleration due to response delay of the boost pressure can be suppressed. Consequently, deterioration in drivability of the vehicle can be suppressed.

In one embodiment, when the requested engine power is lowered in the forced induction range, the controller sets an upper limit value of magnitude of an amount of lowering in engine rotation speed per prescribed time period to be smaller than when the requested engine power is lowered in the non-forced induction range.

By doing so, for example, even when an operation to turn on the accelerator is performed in a short period of time after an accelerator operation, variation in engine rotation speed is slow and hence a boost pressure can be maintained. Therefore, occurrence of a lag in acceleration due to response delay of the boost pressure can be suppressed.

Furthermore, in one embodiment, when the requested engine power is lowered in the forced induction range while the vehicle is in a sport running state, the controller sets the upper limit value of magnitude of change per prescribed time period of the operating point to be smaller than when the requested engine power is lowered in the non-forced induction range.

By doing so, when an operation to turn on the accelerator is performed in a short period of time after the operation to turn off the accelerator while the vehicle is in the sport running state in which importance is not placed on improvement in fuel efficiency for a user, occurrence of a lag in acceleration due to response delay of a boost pressure can be suppressed. Therefore, deterioration in drivability of the vehicle in the sport running state can be suppressed.

A method of controlling a hybrid vehicle according to another aspect of the present disclosure is a method of controlling a hybrid vehicle, the hybrid vehicle including an engine including a forced induction device, a motor generator that generates electric power by using motive power of the engine, and a power divider that divides motive power output from the engine into motive power to be transmitted to the motor generator and motive power to be transmitted to a drive wheel. The method includes setting an operating point at which requested engine power requested of the engine is output and controlling the engine and the motor generator to achieve the set operating point, and setting, when the requested engine power is lowered in a forced induction range where a forced induction operation is performed by the forced induction device, an upper limit value of magnitude of change per prescribed time period of the operating point to be smaller than when the requested engine power is lowered in a non-forced induction range.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
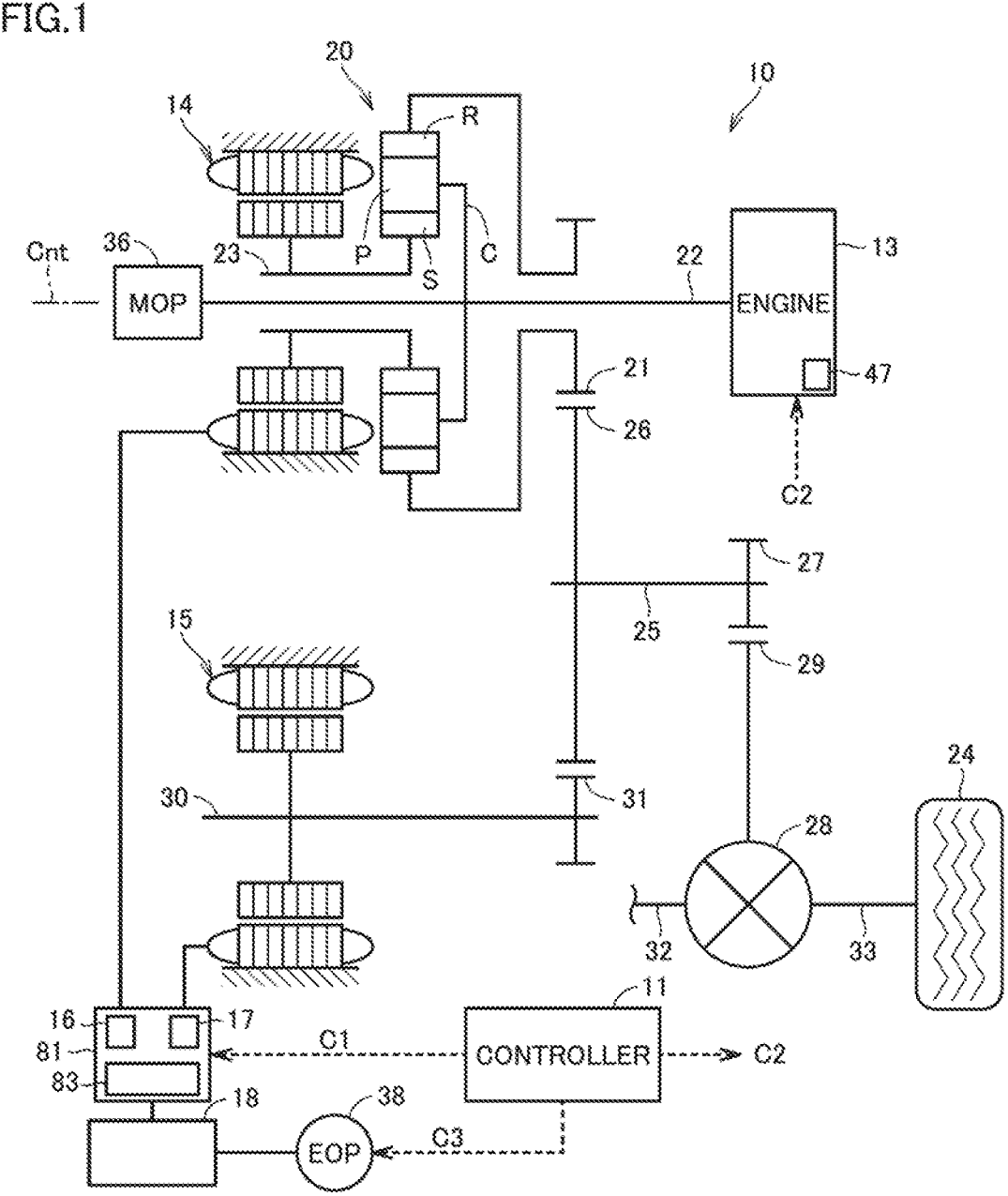
FIG. 1 is a diagram showing an exemplary configuration of a drive system of a hybrid vehicle.

An embodiment of the present disclosure will be described in detail below with reference to the drawings. The same or corresponding elements in the drawings have the same reference characters allotted and description thereof will not be repeated.

As to Drive System of Hybrid Vehicle

FIG. 1 is a diagram showing an exemplary configuration of a drive system of a hybrid vehicle (which is simply denoted as a vehicle below) 10. As shown in FIG. 1, vehicle 10 includes as a drive system, a controller 11 as well as an engine 13, a first motor generator (which is denoted as a first MG below) 14, and a second motor generator (which is denoted as a second MG below) 15 that serve as motive power sources for running. Engine 13 includes a turbo charger 47. First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine includes, for example, a permanent magnet synchronous motor including a rotor having a permanent magnet embedded.

First MG 14 and second MG 15 are electrically connected to a battery 18 with a power control unit (PCU) 81 being interposed. PCU 81 includes a first inverter 16 that supplies and receives electric power to and from first MG 14, a second inverter 17 that supplies and receives electric power to and from second MG 15, battery 18, and a converter 83 that supplies and receives electric power to and from first inverter 16 and second inverter 17.

For example, converter 83 can up-convert electric power from battery 18 and supply up-converted electric power to first inverter 16 or second inverter 17. Alternatively, converter 83 can down-convert electric power supplied from first inverter 16 or second inverter 17 and supply down-converted electric power to battery 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

PCU 81 charges battery 18 with electric power generated by first MG 14 or second MG 15 or drives first MG 14 or second MG 15 with electric power from battery 18.

Battery 18 includes, for example, a lithium ion secondary battery or a nickel metal hydride secondary battery. The lithium ion secondary battery is a secondary battery in which lithium is adopted as a charge carrier, and may include not only a general lithium ion secondary battery containing a liquid electrolyte but also what is called an all-solid-state battery containing a solid electrolyte. Battery 18 should only be a power storage that is at least rechargeable, and for example, an electric double layer capacitor may be employed instead of the secondary battery.

Engine 13 and first MG 14 are coupled to a planetary gear mechanism 20. Planetary gear mechanism 20 transmits drive torque output from engine 13 by dividing drive torque into drive torque to first MG 14 and drive torque to an output gear 21, and represents an exemplary power divider in the embodiment of the present disclosure. Planetary gear mechanism 20 includes a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Output shaft 22 is coupled to carrier C. A rotor shaft 23 of first MG 14 is coupled to sun gear S. Ring gear R is coupled to output gear 21. Output gear 21 represents one of output elements for transmitting drive torque to a drive wheel 24.

In planetary gear mechanism 20, carrier C to which drive torque output from engine 13 is transmitted serves as an input element, ring gear R that outputs drive torque to output gear 21 serves as an output element, and sun gear S to which rotor shaft 23 is coupled serves as a reaction force element. Planetary gear mechanism 20 divides motive power output from engine 13 into motive power on a side of first MG 14 and motive power on a side of output gear 21. First MG 14 is controlled to output torque in accordance with an engine rotation speed.

A countershaft 25 is arranged in parallel to axis Cnt. Countershaft 25 is attached to a driven gear 26 meshed with output gear 21. A drive gear 27 is attached to countershaft 25, and drive gear 27 is meshed with a ring gear 29 in a differential gear 28 representing a final reduction gear. A drive gear 31 attached to a rotor shaft 30 in second MG 15 is meshed with driven gear 26. Therefore, drive torque output from second MG 15 is added to drive torque output from output gear 21 in a part of driven gear 26. Drive torque thus combined is transmitted to drive wheel 24 with driveshafts 32 and 33 extending laterally from differential gear 28 being interposed. As drive torque is transmitted to drive wheel 24, driving force is generated in vehicle 10.

A mechanical oil pump (which is denoted as an MOP below) 36 is provided coaxially with output shaft 22. MOP 36 delivers lubricating oil with a cooling function, for example, to planetary gear mechanism 20, first MG 14, second MG 15, and differential gear 28. Vehicle 10 further includes an electric oil pump (which is denoted as an EOP below) 38. EOP 38 is driven by electric power supplied from battery 18 when operation of engine 13 is stopped, and it delivers lubricating oil to planetary gear mechanism 20, first MG 14, second MG 15, and differential gear 28 in a manner the same as or similar to MOP 36.

As to Configuration of Engine

Figure 2:
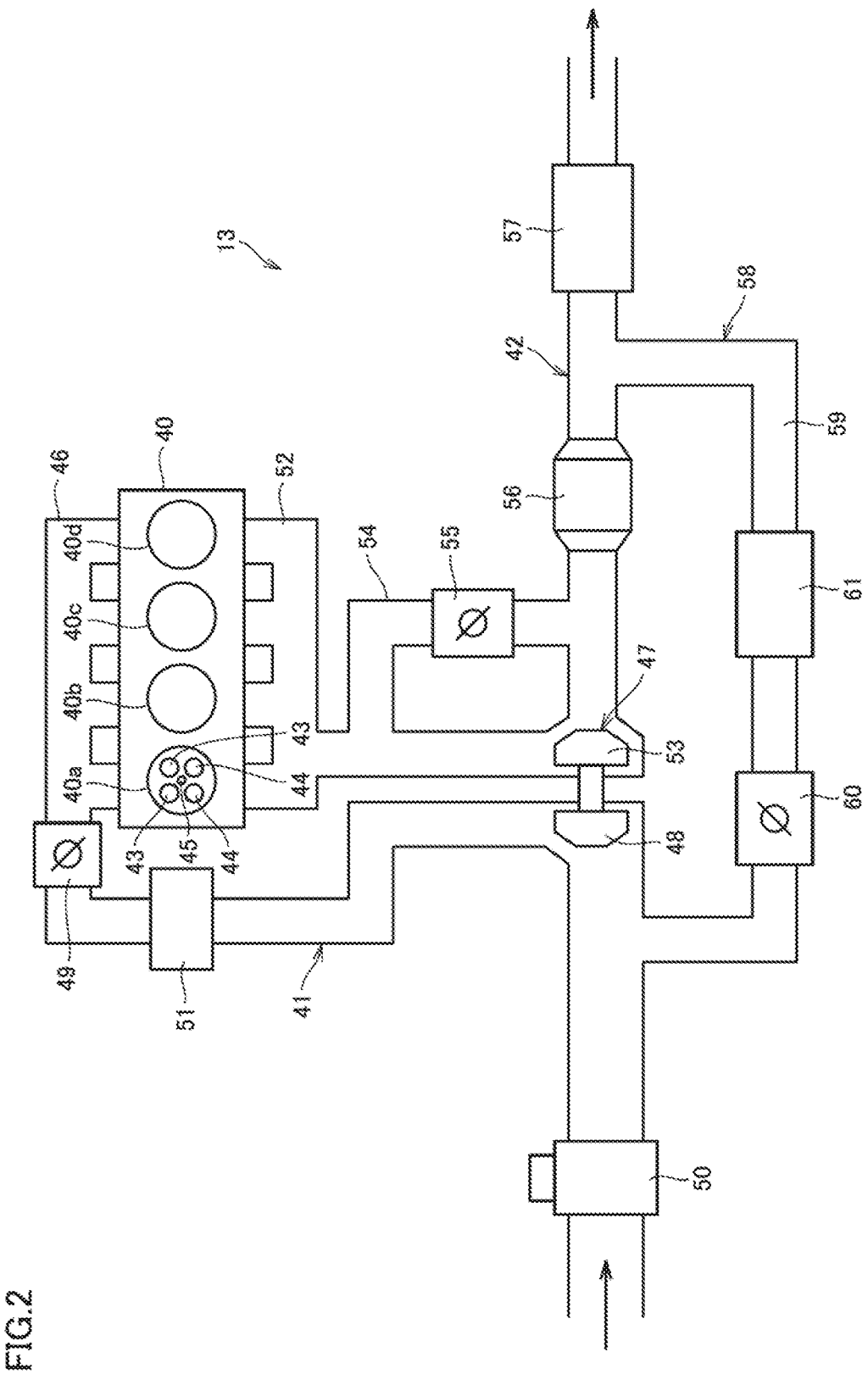
FIG. 2 is a diagram showing an exemplary configuration of an engine including a turbo charger.

FIG. 2 is a diagram showing an exemplary configuration of engine 13 including turbo charger 47. Engine 13 is, for example, an in-line four-cylinder spark ignition internal combustion engine. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d, and one end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

In the present embodiment, engine 13 is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with turbo charger 47 that uses exhaust energy to boost suctioned air. Turbo charger 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 to controller 11 is provided between the other end (air inlet) of intake air passage 41 and compressor 48. An intercooler 51 that cools intake air pressurized by compressor 48 is disposed in intake air passage 41 provided downstream from compressor 48. An intake throttle valve (throttle valve) 49 that can regulate a flow rate of intake air that flows through intake air passage 41 is provided between intercooler 51 and one end of intake air passage 41.

An exhaust passage 42 has one end connected to exhaust manifold 52 and the other end connected to a muffler (not shown). Turbine 53 is provided at a prescribed position in exhaust passage 42. As turbine 53 is activated by exhaust, compressor 48 is activated in coordination with turbine 53. As a result of activation of compressor 48, intake air taken in through the air inlet is pressurized.

In exhaust passage 42, a bypass passage 54 that bypasses exhaust upstream from turbine 53 to a portion downstream from turbine 53 and a waste gate valve 55 provided in bypass passage 54 and capable of regulating a flow rate of exhaust guided to bypass passage 54 are provided. Therefore, a flow rate of exhaust that flows into turbine 53, that is, a boost pressure of suctioned air, is regulated by controlling a position of waste gate valve 55.

Exhaust that passes through turbine 53 or waste gate valve 55 is purified by a start-up converter 56 and an aftertreatment apparatus 57 provided at prescribed positions in exhaust passage 42, and thereafter emitted into the atmosphere. Aftertreatment apparatus 57 contains, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start-up converter 56 and aftertreatment apparatus 57 to a portion of intake air passage 41 between compressor 48 and air flow meter 50.

As to Configuration of Controller

Figure 3:
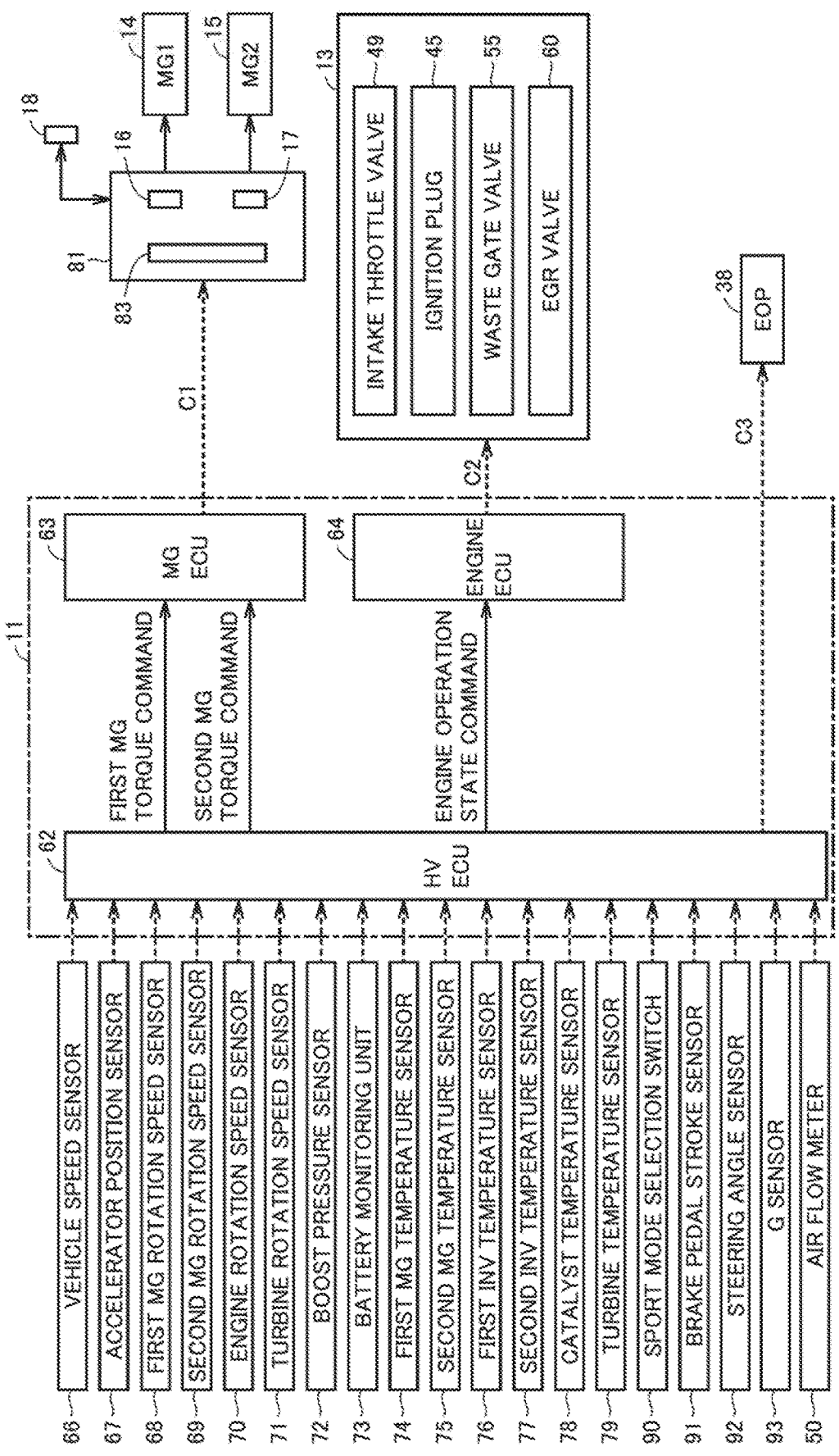
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation by PCU 81. Engine ECU 64 is a controller that controls an operation by engine 13.

HV-ECU 62, MG-ECU 63, and engine ECU 64 each include an input and output apparatus that supplies and receives signals to and from various sensors and other ECUs that are connected, a storage that serves for storage of various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, a turbine temperature sensor 79, a sport mode selection switch 90, a brake pedal stroke sensor 91, a steering angle sensor 92, a G sensor 93, and air flow meter 50 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of turbo charger 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Brake pedal stroke sensor 91 detects an amount of pressing of a brake pedal. Steering angle sensor 92 detects a steering angle (that is, an angle of rotation of a steering wheel). The G sensor detects an acceleration in a prescribed direction (for example, a front-rear direction, a lateral direction, or a vertical direction) of vehicle 10. Various sensors output signals indicating results of detection to HV-ECU 62.

Sport mode selection switch 90 is an operation apparatus for selecting a sport mode as one of control modes associated with responsiveness to an accelerator operation. The sport mode may be, for example, a mode in which requested driving force for an accelerator position is higher than requested driving force for the same accelerator position while the sport mode is not selected, or a mode in which an operating line higher in engine torque for the same engine rotation speed than an operating line while the sport mode is not selected is selected as a predetermined operating line which will be described later. The sport mode may be selected, for example, also in an EV running mode or an HV running mode which will be described later. When a user operates sport mode selection switch 90, a signal indicating the operation by the user is output from sport mode selection switch 90 to HV-ECU 62. When HV-ECU 62 receives the signal indicating the operation from sport mode selection switch 90, it sets requested driving force to be higher than when the sport mode is not selected as described above, or selects the operating line higher in engine torque than when the sport mode is not selected. When the sport mode is selected, HV-ECU 62 may turn on a flag indicating selection of the sport mode (a selection flag).

Battery monitoring unit 73 obtains a state of charge (SOC) representing a ratio of a remaining amount of charge to a full charge capacity of battery 18 and outputs a signal indicating the obtained SOC to HV-ECU 62.

Battery monitoring unit 73 includes, for example, a sensor that detects a current, a voltage, and a temperature of battery 18. Battery monitoring unit 73 obtains an SOC by calculating the SOC based on the detected current, voltage, and temperature of battery 18.

Various known approaches such as an approach by accumulation of current values (coulomb counting) or an approach by estimation of an open circuit voltage (OCV) can be adopted as a method of calculating an SOC.

As to Control of Running of Vehicle

Vehicle 10 configured as above can be set or switched to such a running mode as a hybrid (HV) running mode in which engine 13 and second MG 15 serve as motive power sources and an electric (EV) running mode in which the vehicle runs with engine 13 remaining stopped and second MG 15 being driven by electric power stored in battery 18. Setting of and switching to each mode is made by HV-ECU 62. HV-ECU 62 controls engine 13, first MG 14, and second MG 15 based on the set or switched running mode.

The EV running mode is selected, for example, in a low-load operation region where a vehicle speed is low and requested driving force is low, and refers to a running mode in which an operation by engine 13 is stopped and second MG 15 outputs driving force.

The HV running mode is selected in a high-load operation region where a vehicle speed is high and requested driving force is high, and refers to a running mode in which combined torque of drive torque of engine 13 and drive torque of second MG 15 is output.

In the HV running mode, in transmitting drive torque output from engine 13 to drive wheel 24, first MG 14 applies reaction force to planetary gear mechanism 20. Therefore, sun gear S functions as a reaction force element. In other words, in order to apply engine torque to drive wheel 24, first MG 14 is controlled to output reaction torque against engine torque. In this case, regenerative control in which first MG 14 functions as a generator can be carried out.

Control of engine 13, first MG 14, and second MG 15 in coordination while vehicle 10 operates will be described below.

HV-ECU 62 calculates requested driving force based on an accelerator position determined by an amount of pressing of the accelerator pedal. HV-ECU 62 calculates requested running power of vehicle 10 based on the calculated requested driving force and a vehicle speed. HV-ECU 62 calculates a value resulting from addition of requested charging and discharging power of battery 18 to requested running power as requested system power. Requested charging and discharging power of battery 18 is set, for example, in accordance with a difference from an SOC of battery 18 and a predetermined control central value.

HV-ECU 62 determines whether or not activation of engine 13 has been requested in accordance with calculated requested system power. HV-ECU 62 determines that activation of engine 13 has been requested, for example, when requested system power exceeds a threshold value. When activation of engine 13 has been requested, HV-ECU 62 sets the HV running mode as the running mode. When activation of engine 13 has not been requested, HV-ECU 62 sets the EV running mode as the running mode.

When activation of engine 13 has been requested (that is, when the HV running mode is set), HV-ECU 62 calculates power requested of engine 13 (which is denoted as requested engine power below). For example, HV-ECU 62 calculates requested system power as requested engine power. For example, when requested system power exceeds an upper limit value of requested engine power, HV-ECU 62 calculates the upper limit value of requested engine power as requested engine power. HV-ECU 62 outputs calculated requested engine power as an engine operation state command to engine ECU 64.

Engine ECU 64 transmits a control signal C2 based on the engine operation state command input from HV-ECU 62 and variously controls each component of engine 13 such as intake throttle valve 49, ignition plug 45, waste gate valve 55, and EGR valve 60.

HV-ECU 62 sets based on calculated requested engine power, an operating point of engine 13 in a coordinate system defined by an engine rotation speed and engine torque. HV-ECU 62 sets, for example, an intersection between an equal power line equal in output to requested engine power in the coordinate system and a predetermined operating line as the operating point of engine 13.

The predetermined operating line represents a trace of variation in engine torque with variation in engine rotation speed in the coordinate system, and it is set, for example, by adapting the trace of variation in engine torque high in fuel efficiency through experiments.

HV-ECU 62 sets the engine rotation speed corresponding to the set operating point as a target engine rotation speed.

As the target engine rotation speed is set, HV-ECU 62 sets a torque command value for first MG 14 for setting a current engine rotation speed to the target engine rotation speed. HV-ECU 62 sets the torque command value for first MG 14, for example, through feedback control based on a difference between a current engine rotation speed and the target engine rotation speed.

HV-ECU 62 calculates engine torque to be transmitted to drive wheel 24 based on the set torque command value for first MG 14 and sets a torque command value for second MG 15 so as to fulfill requested driving force. HV-ECU 62 outputs set torque command values for first MG 14 and second MG 15 as a first MG torque command and a second MG torque command to MG-ECU 63.

MG-ECU 63 calculates a current value corresponding to torque generated by first MG 14 and second MG 15 and a frequency thereof based on the first MG torque command and the second MG torque command input from HV-ECU 62, and outputs a control signal C1 including the calculated current value and the frequency thereof to PCU 81.

HV-ECU 62 further transmits a control signal C3 based on an operation state including the running mode to EOP 38 and controls drive of EOP 38.

HV-ECU 62 requests increase in boost pressure, for example, when the set operating point is in the forced induction range. In the present embodiment, a boundary between the forced induction range and the non-forced induction range (a normal aspiration range) may be defined by a threshold value of engine torque or by engine torque and the engine rotation speed. For example, when the boundary between the forced induction range and the non-forced induction range is defined by the threshold value of engine torque, HV-ECU 62 may request increase in boost pressure when engine torque corresponding to the set operating point exceeds the threshold value. Alternatively, when the boundary between the forced induction range and the non-forced induction range is defined by engine torque and the engine rotation speed, HV-ECU 62 may request increase in boost pressure when the engine rotation speed and engine torque corresponding to the set operating point attain to values corresponding to values within the forced induction range.

Though FIG. 3 illustrates a configuration in which HV-ECU 62, MG-ECU 63, and engine ECU 64 are separately provided by way of example, the ECUs may be integrated as a single ECU.

As to Relation Between Accelerator Operation and Control of Running of Vehicle In vehicle 10 including turbo charger 47 configured as set forth above, for example, when an operation to turn off the accelerator is performed with the HV running mode being selected, power requested of engine 13 is lowered or engine 13 is stopped in response to the operation by a user from a point of view of improvement in fuel efficiency. When an operation to turn on the accelerator is performed again in a short period of time after the operation to turn off the accelerator, however, a lag in acceleration due to response delay of a boost pressure may occur. In particular, in the hybrid vehicle, engine 13 may be stopped also by the operation to turn off the accelerator as described above. Therefore, when the operation to turn on the accelerator is performed in a short period of time after the operation to turn off the accelerator, a lag in acceleration may more noticeably occur. Consequently, drivability of vehicle 10 may become poor.

In the present embodiment, when requested engine power requested of engine 13 is lowered in the forced induction range in which a forced induction operation is performed by turbo charger 47, HV-ECU 62 sets an upper limit value of magnitude of change per prescribed time period of the operating point to be smaller than when requested engine power is lowered in the non-forced induction range.

By doing so, for example, even when an operation to turn on the accelerator is performed in a short period of time after the operation to turn off the accelerator in the forced induction range, change of the operating point is slower than in the non-forced induction range. Therefore, a boost pressure can be maintained and quick stop of engine 13 can be suppressed. Therefore, occurrence of a lag in acceleration due to response delay of the boost pressure can be suppressed. Consequently, deterioration in drivability of vehicle 10 can be suppressed.

As to Processing Performed by HV-ECU 62

Figure 4:
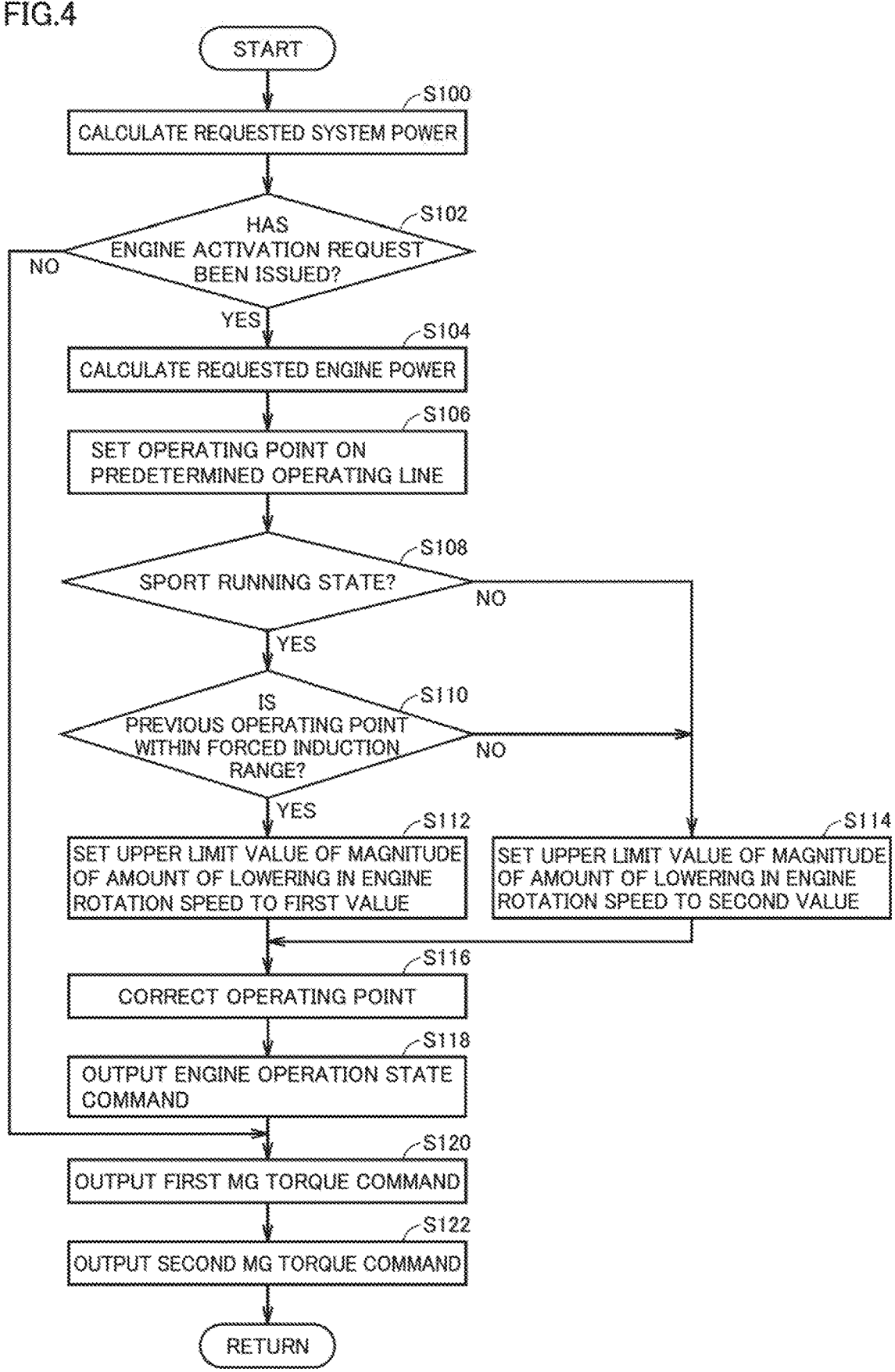
FIG. 4 is a flowchart showing exemplary processing performed by an HV-ECU.

Processing performed by HV-ECU 62 will be described below with reference to FIG. 4. FIG. 4 is a flowchart showing exemplary processing performed by HV-ECU 62.

In a step (a step being denoted as S below) 100, HV-ECU 62 calculates requested system power.

In S102, HV-ECU 62 determines whether or not a request for activation of engine 13 has been issued. When it is determined that the request for activation of engine 13 has been issued (YES in S102), the process proceeds to S104.

In S104, HV-ECU 62 calculates requested engine power. HV-ECU 62 calculates, for example, requested system power described above as requested engine power.

Since a method of calculating requested system power, a method of determining a request for activation of engine 13, and a method of calculating requested engine power are as described above, detailed description thereof will not be repeated.

In S106, HV-ECU 62 sets the operating point on the predetermined operating line. Specifically, HV-ECU 62 sets an intersection between the equal power line of requested engine power and the predetermined operating line as the operating point. Since the equal power line and the predetermined operating line are as described above, detailed description thereof will not be repeated.

In S108, HV-ECU 62 determines whether or not the vehicle is in a sport running state. For example, when a sport running mode has been selected, HV-ECU 62 determines that vehicle 10 is in the sport running state. For example, when the selection flag is on, HV-ECU 62 may determine that the vehicle is in the sport running state. When it is determined that the vehicle is in the sport running state (YES in S108), the process proceeds to S110.

In S110, HV-ECU 62 determines whether or not the previous operating point is within the forced induction range. For example, in an example where the boundary between the forced induction range and the non-forced induction range is defined by the threshold value of engine torque, HV-ECU 62 may determine that the previous operating point is within the forced induction range when engine torque corresponding to the previous operating point is higher than the threshold value. Alternatively, in an example where the boundary between the forced induction range and the non-forced induction range is defined by engine torque and the number of rotations of engine, the HV-ECU may determine that the previous operating point is within the forced induction range when the previous operating point is located on a side of the forced induction range relative to the boundary defined by engine torque and the number of rotations of the engine. When the previous operating point is determined as being within the forced induction range (YES in S110), the process proceeds to S112.

In S112, HV-ECU 62 sets a first value as the upper limit value of magnitude of an amount of lowering in engine rotation speed. The first value is, for example, a predetermined value and an upper limit value of magnitude of an amount of lowering in engine rotation speed corresponding to the sport running state. The first value is smaller than a second value representing the upper limit value of magnitude of an amount of lowering in engine rotation speed corresponding to a state other than the sport running state which will be described later. The first value is set such that lowering in engine rotation speed is slower than when the second value is set.

When it is determined that the vehicle is not in the sport running state (NO in S108) or when it is determined that change of the operating point is not change within the forced induction range (NO in S110), the process proceeds to S114.

In S114, HV-ECU 62 sets the second value as the upper limit value of magnitude of an amount of lowering in engine rotation speed. The second value is, for example, a predetermined value and the upper limit value of magnitude of an amount of lowering in engine rotation speed corresponding to a state other than the sport running state as described above. The second value should only be greater than the first value and is not particularly limited.

In S116, HV-ECU 62 corrects with the set upper limit value, the operating point set in S106. For example, when magnitude of an amount of lowering in engine rotation speed exceeds the upper limit value in change from the previous operating point to the current operating point, HV-ECU 62 sets as the corrected operating point, a position on the predetermined operating line lower than the previous operating point by the upper limit value of magnitude of an amount of lowering in engine rotation speed. When magnitude of an amount of lowering in engine rotation speed in change from the previous operating point to the current operating point is equal to or smaller than the upper limit value, HV-ECU 62 sets the current operating point as the corrected operating point.

In S118, HV-ECU 62 outputs an engine operation state command. Specifically, HV-ECU 62 generates the engine operation state command with engine power corresponding to the corrected operating point being defined as requested engine power, and outputs the engine operation state command to engine ECU 64. When it is determined that a request for activation of engine 13 has not been issued (NO in S102), the process proceeds to S120.

In S120, HV-ECU 62 outputs a first MG torque command. Specifically, HV-ECU 62 sets the engine rotation speed corresponding to the corrected operating point as a target engine rotation speed. HV-ECU 62 sets a torque command value for first MG 14 for setting the current engine rotation speed to the set target engine rotation speed. HV-ECU 62 outputs the set torque command value for first MG 14 as the first MG torque command to MG-ECU 63.

In S122, HV-ECU 62 outputs a second MG torque command. Specifically, HV-ECU 62 calculates engine torque to be transmitted to drive wheel 24 based on the torque command value from first MG 14 and a gear ratio of each rotary element of planetary gear mechanism 20 and sets a torque command value for second MG 15 so as to fulfill requested driving force. HV-ECU 62 outputs the set torque command value for second MG 15 as a second MG torque command to MG-ECU 63.

When a request for activation of engine 13 has not been issued, HV-ECU 62 sets the torque command value for second MG 15 such that second MG 15 alone generates requested driving force.

As to Exemplary Operation by HV-ECU 62

Figure 5:
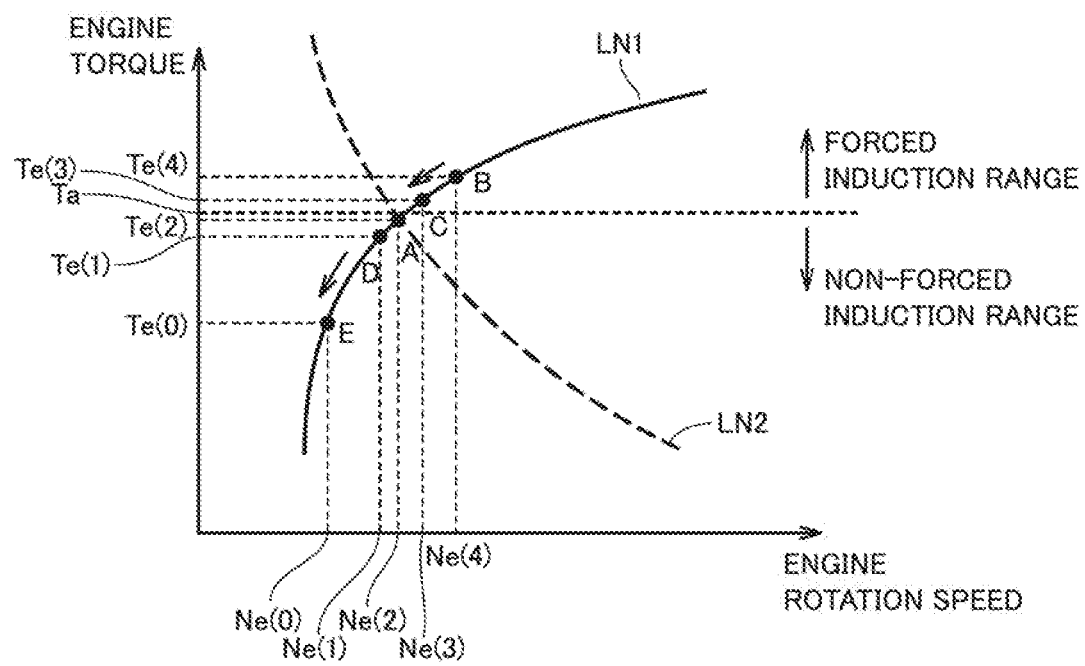
FIG. 5 is a diagram for illustrating an exemplary operation by the HV-ECU.

An operation by HV-ECU 62 according to the present embodiment based on the structure and the flowchart as set forth above will be described with reference to FIG. 5. FIG. 5 is a diagram for illustrating an exemplary operation by HV-ECU 62. The ordinate in FIG. 5 represents engine torque. The abscissa in FIG. 5 represents an engine rotation speed. FIG. 5 shows a predetermined operating line LN1 (a solid line) corresponding to the sport running mode. FIG. 5 shows an equal power line of (exemplary) requested engine power LN2 (a dashed line). The boundary between the forced induction range and the non-forced induction range is assumed as being defined by a threshold value Ta of engine torque. An example in which the sport running mode has been selected (that is, an example in which the selection flag is on) is assumed.

For example, a point B is assumed as the previous operating point. At point B, the engine rotation speed attains to Ne(4) and engine torque attains to Te(4).

For example, when the operation to turn off the accelerator is performed, requested system power in accordance with an accelerator position is calculated (S100). When it is determined that a request for activation of engine 13 has been issued as calculated requested system power has exceeded the threshold value (YES in S102), requested engine power is calculated (S104) and the operating point is set on the predetermined operating line (S106). Intersection A between the predetermined operating line (LN1 in FIG. 5) and the equal power line (LN2 in FIG. 5) of requested engine power is set as the operating point. At intersection A, the engine rotation speed attains to Ne(2) and engine torque attains to Te(2).

The vehicle is determined as being in the sport running state (YES in S108) because the selection flag is on and the previous operating point (point B) is determined as being within the forced induction range (YES in S110). Therefore, the first value is set as the upper limit value of magnitude of an amount of lowering in engine rotation speed (S112). Magnitude of the first value is equal to magnitude from Ne(4) to Ne(3).

In change from the previous operating point (point B) to the current operating point (point A), the engine rotation speed is lowered from Ne(4) to Ne(2). Since this magnitude of an amount of lowering exceeds the upper limit value (the first value), a point C on the predetermined operating line at which an engine rotation speed lower than the previous operating point (point B) by the upper limit value of magnitude of an amount of lowering in engine rotation speed is achieved is set as the corrected operating point (S116). At point C, the engine rotation speed attains to Ne(3) and engine torque attains to Te(3).

The engine operation state command is output to engine ECU 64 with engine power corresponding to point C as the operating point being defined as requested engine power (S118).

Then, the first MG torque command corresponding to point C defined as the operating point is output to MG-ECU 63 (S120) and the second MG torque command is output to MG-ECU 63 (S122). Consequently, lowering in engine torque is suppressed and the operating point is maintained within the forced induction range. Therefore, the forced induction state in which forced induction by turbo charger 47 is performed is maintained.

On the other hand, a point D within the non-forced induction range is assumed as the previous operating point. At point D, the engine rotation speed attains to Ne(1) and engine torque attains to Te(1).

For example, when the operation to turn off the accelerator is performed, requested system power in accordance with an accelerator position is calculated (S100). When it is determined that a request for activation of engine 13 has been issued as calculated requested system power has exceeded the threshold value (YES in S102), requested engine power is calculated (S104) and the operating point is set on the predetermined operating line (S106). At this time, an intersection E is set as the operating point. At point E, the engine rotation speed attains to Ne(0) and engine torque attains to Te(0).

Though the vehicle is determined as being in the sport running state because the selection flag is on (YES in S108), the previous operating point (point D) is determined as not being within the forced induction range (NO in S110). Therefore, the second value is set as the upper limit value of magnitude of an amount of lowering in engine rotation speed (S114). The second value is assumed as being larger than the first value and larger than magnitude from Ne(4) to Ne(2).

In change from the previous operating point (point D) to the current operating point (point E), the engine rotation speed lowers from Ne(1) to Ne(0). Magnitude of an amount of lowering is assumed as being equal to magnitude of an amount of lowering from Ne(4) to Ne(2). Since this magnitude of the amount of lowering is not more than the upper limit value (the second value), point E is set as the corrected operating point (S116).

The engine operation state command is output to engine ECU 64 with engine power corresponding to point E as the operating point being defined as requested engine power (S118).

Then, the first MG torque command corresponding to point E defined as the operating point is output to MG-ECU 63 (S120) and the second MG torque command is output to MG-ECU 63 (S122).

As to Function and Effect

As set forth above, according to the hybrid vehicle in the present embodiment, for example, even when the operation to turn on the accelerator is performed in a short period of time after the operation to turn off the accelerator in the forced induction range while the sport running mode has been selected in which importance is not placed on improvement in fuel efficiency for a user, change of the operating point (specifically, lowering in engine rotation speed) is slower than in the non-forced induction range. Therefore, a boost pressure can be maintained and quick stop of engine 13 can be suppressed. Therefore, occurrence of a lag in acceleration due to response delay of the boost pressure can be suppressed. Consequently, deterioration in drivability of vehicle 10 can be suppressed. Therefore, a hybrid vehicle that achieves suppressed occurrence of a lag of acceleration due to response delay of a boost pressure and a method of controlling a hybrid vehicle can be provided.

As to Modification

A modification will be described below.

Though intake throttle valve 49 is described as being provided between intercooler 51 and intake manifold 46 in the embodiment above, it may be provided, for example, in intake air passage 41 between compressor 48 and air flow meter 50.

Though a boost pressure is regulated by adjusting a position of the waste gate valve according to the description of the embodiment above, the boost pressure may be regulated, for example, by providing a motor generator in a shaft that couples compressor 48 and turbine 53 to each other and controlling a turbine rotation speed by means of the motor generator, or the boost pressure may be regulated by adjusting a gap (a vane position) between adjacent vanes among a plurality of vanes arranged around an outer circumference of a blade of turbine 53.

Though the upper limit value of magnitude of an amount of lowering in engine rotation speed is set according to the description of the embodiment above, the upper limit value of magnitude of change of the operating point should only be set, and for example, the upper limit value of magnitude of an amount of lowering in engine torque instead of the engine rotation speed may be set, or the upper limit value of magnitude of an amount of lowering in engine power may be set.

Though vehicle 10 is determined as being in the sport running state when the sport running mode has been selected according to the description of the embodiment above, whether or not vehicle 10 is in the sport running state may be determined, for example, based on records of running. For example, when a ratio of a duration for which magnitude of acceleration of vehicle 10 detected by G sensor 93 over a prescribed period exceeds a threshold value is equal to or higher than a threshold value, HV-ECU 62 may determine vehicle 10 as being in the sport running state. Alternatively, when a ratio of a duration for which magnitude of an amount of change in accelerator position over a prescribed period exceeds a threshold value is equal to or higher than a threshold value, HV-ECU 62 may determine vehicle 10 as being in the sport running state. Alternatively, when a ratio of a duration for which magnitude of an amount of change in brake pedal stroke over a prescribed period exceeds a threshold value is equal to or higher than a threshold value, HV-ECU 62 may determine vehicle 10 as being in the sport running state. Alternatively, when a ratio of a duration for which magnitude of an amount of change in steering angle over a prescribed period exceeds a threshold value is equal to or higher than a threshold value, HV-ECU 62 may determine vehicle 10 as being in the sport running state.

Though processing for setting the upper limit value (first value) of magnitude of an amount of lowering in engine rotation speed with the previous operating point being within the forced induction range to be smaller than the upper limit value (second value) of magnitude of an amount of lowering in engine rotation speed with the previous operating point being within the non-forced induction range is performed only while vehicle 10 is in the sport running state according to the description in the embodiment above, the processing may be performed regardless of whether or not vehicle 10 is in the sport running state. The process performed by HV-ECU 62 in the modification is the same, for example, as the process without processing in S108 in the flowchart in FIG. 4. Therefore, detailed description will not be repeated.

Though the turbo charger is described as an exemplary forced induction device in the embodiment above, for example, a supercharger that drives a compressor with motive power of engine 13 may be applied instead of turbo charger 47.

The modification above may be carried out as being combined in its entirety or in part as appropriate.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A hybrid vehicle comprising:
an engine including a forced induction device;
a motor generator that generates electric power by using motive power of the engine;
a power divider that divides motive power output from the engine into motive power to be transmitted to the motor generator and motive power to be transmitted to a drive wheel; and
a controller that sets an operating point at which requested engine power is output and controls the engine and the motor generator to achieve the set operating point, wherein
when the requested engine power is lowered in a forced induction range where a forced induction operation is performed by the forced induction device, the controller sets an upper limit value of magnitude of change per prescribed time period of the operating point to be smaller than when the requested engine power is lowered in a non-forced induction range.

2. The hybrid vehicle according to claim 1, wherein when the requested engine power is lowered in the forced induction range, the controller sets an upper limit value of magnitude of an amount of lowering in engine rotation speed per prescribed time period to be smaller than when the requested engine power is lowered in the non- forced induction range.

3. The hybrid vehicle according to claim 1, wherein when the requested engine power is lowered in the forced induction range while the vehicle is in a sport running state, the controller sets the upper limit value of magnitude of change per prescribed time period of the operating point to be smaller than when the requested engine power is lowered in the non-forced induction range.

4. A method of controlling a hybrid vehicle, the hybrid vehicle including an engine including a forced induction device, a motor generator that generates electric power by using motive power of the engine, and a power divider that divides motive power output from the engine into motive power to be transmitted to the motor generator and motive power to be transmitted to a drive wheel, the method comprising:
setting an operating point at which requested engine power is output and controlling the engine and the motor generator to achieve the set operating point; and
when the requested engine power is lowered in a forced induction range where a forced induction operation is performed by the forced induction device, setting an upper limit value of magnitude of change per prescribed time period of the operating point to be smaller than when the requested engine power is lowered in a non-forced induction range.

* * * * *